United States Patent [19]

Borenstein et al.

[11] Patent Number: 5,043,170
[45] Date of Patent: Aug. 27, 1991

[54] ANIMAL FEED COMPOSITION CONTAINING A VITAMIN D METABOLITE

[75] Inventors: Benjamin Borenstein, Teaneck; William J. Mergens, West Caldwell; Govind G. Untawale, Wayne, all of N.J.

[73] Assignee: Hoffmann-La Roche Inc., Nutley, N.J.

[21] Appl. No.: 310,441

[22] Filed: Feb. 14, 1989

[51] Int. Cl.$^5$ .............................................. A23L 1/303
[52] U.S. Cl. ........................................ 426/73; 426/2; 426/311; 514/167; 424/442
[58] Field of Search ................... 426/73, 74, 2, 311, 426/541, 635, 648, 72, 53, 54; 514/167; 424/442

[56] References Cited

U.S. PATENT DOCUMENTS

| | | | |
|---|---|---|---|
| 2,758,923 | 8/1956 | Wakely | 426/73 |
| 3,072,533 | 1/1963 | Johnson | 426/73 |
| 3,639,596 | 2/1972 | DeLuca | 514/167 |
| 3,639,596 | 2/1972 | DeLuca et al. | |
| 3,646,203 | 2/1972 | DeLuca | 514/167 |
| 3,823,237 | 7/1974 | Frank | 514/167 |
| 3,833,622 | 9/1974 | Babcock et al. | |
| 4,012,509 | 3/1977 | Frank | |
| 4,164,569 | 8/1979 | Ikushima | 514/167 |
| 4,211,782 | 7/1980 | Vane | 514/167 |
| 4,248,867 | 2/1981 | Ikushima | 514/167 |
| 4,310,522 | 1/1982 | Frank | 424/236 |
| 4,341,774 | 7/1982 | Aoki et al. | 424/236 |
| 4,461,766 | 7/1984 | DeLuca | 514/167 |
| 4,670,247 | 6/1987 | Scialpi | |

FOREIGN PATENT DOCUMENTS

| | | | |
|---|---|---|---|
| 0033197 | 8/1981 | European Pat. Off. | 426/2 |
| 0125894 | 11/1984 | European Pat. Off. | 426/311 |
| 285682 | 4/1987 | European Pat. Off. | |
| 2716601 | 10/1977 | Fed. Rep. of Germany | 514/167 |
| 0021354 | 2/1984 | Japan | 426/2 |
| 120812 | 6/1985 | Japan | 514/167 |
| 7216898 | 6/1973 | Netherlands | 514/167 |
| 2047536 | 12/1980 | United Kingdom | 514/167 |

OTHER PUBLICATIONS

Patent Abstract of Japan, vol. 11, No. 246 (C-439) 2693, Aug. 11, 1987.
Kutsky, 1973 Handbook of Vitamins and Hormones, Van Nostrand Reinhold Co., New York, pp. 16–22.
Hawley, 1981 The Condensed Chemical Dictionary, Van Nostrand Reinhold Co., New York, p. 245.
Lehninger, 1970, Biochemistry, Worth Publishers Inc., p. 207.
Wagner et al, 1964, Vitamins and Coenzymes Interscience Publishers, New York, pp. 330–333 and 356.
Aurbach, 1983, Vitamins and Hormones, Academic Press, New York, pp. 235–239.
Roche Chemical Division Product List, Jan. 15, 1984, p. 4.
Poultry Science, 63:2075–2083 (1984).
Journal of Nutrition 109: p. 1601.
Poultry Science, 58: p. 1004 (1979).
Seventh International Congress on Hormonal Steroids, Madrid, Spain,—Sep. 21–26, 1986, Tsang et al.
"Essentiality of Vitamin $D_3$ and Its Metabolites in Poultry Nutrition"; A Review, Ameenuddin et al.
Poultry Science, 55: p. 1983 (1976).

Primary Examiner—Carolyn Paden
Attorney, Agent, or Firm—George M. Gould; Bernard S. Leon; Ellen C. Coletti

[57] ABSTRACT

Poultry feed premixes and finished poultry feeds which contain particles comprising a Vitamin $D_3$ metabolite and Vitamin $D_3$ in a weight ratio ranging from about 1:2.5 to about 1:125 are described. These premixes and feeds are useful for promoting egg shell strength and bone strength in older egg laying hens as well as to provide to such hens the usual benefits of Vitamin $D_3$ in a diet. The invention also relates to methods for improving egg shell strength in older egg laying hens which comprise administering to hens such particles.

23 Claims, No Drawings

ANIMAL FEED COMPOSITION CONTAINING A VITAMIN D METABOLITE

BACKGROUND OF THE INVENTION

Older egg laying hens have the problem of laying eggs which do not have sufficient shell strength or a sufficient amount of calcium in their shells Said eggs have shells that are too fragile and that easily break during subsequent handling and shipping.

Egg breakage is a serious economic loss at all stages of egg production including, handling at the farm, shipping, and end user handling. It has been estimated that egg breakage may be as high as 5 to 6 percent of total egg production in normal channels in the United States. The economic losses which result from such breakage are clear.

An additional economic problem in older egg laying hens is an increase in bone fragility and decrease in bone strength. Processing of these "spent" hens for inclusion of their meat in soups and other processed foods results in the generation of broken bones and bone splinters which are economically costly to control.

It is known that certain Vitamin $D_3$ metabolites, namely $1\alpha$-hydroxycholecalciferol and $1\alpha,25$-dihydroxycholecalciferol improve the egg shell strength of older laying hens. Moreover, it is also known that Vitamin $D_3$ is utilized by the hen for many benefits including leg strength.

It is an object of this invention to provide a poultry feed composition which improves the shell strength of eggs produced by older laying hens and to thereby minimize the economic loss due to egg breakage. It is a further object of this invention to provide a poultry feed composition which supplies to the egg laying hen Vitamin $D_3$, itself, thereby enabling the egg laying hen to obtain the usual benefits (not attainable through Vitamin $D_3$ metabolites) of Vitamin D in the diet.

As has been pointed out above, it is known that certain metabolites of Vitamin $D_3$, namely $1\alpha$-hydroxycholecalciferol and $1\alpha,25$-dihydroxycholecalciferol improve the egg shell strength and bone strength of older egg laying hens. However, the commercial use of these Vitamin $D_3$ metabolites is severely limited by several inherent characteristics of these compounds, including poor chemical stability and a narrow window between noneffectiveness and toxicity.

More specifically, these Vitamin $D_3$ metabolites show instability to moisture, oxygen, light, heat, and trace minerals. These just mentioned conditions are unavoidable in feed manufacture.

Furthermore, effective levels of these Vitamin $D_3$ metabolites for use in improving egg shell strength in older egg laying hens are extremely low as compared to other micro nutrients, and therefore it is extremely difficult to properly distribute these compounds in feed without having portions of the resulting feed contain either too low or too high a concentration. If a portion of the resulting feed contains too low a concentration of the required Vitamin $D_3$ metabolite, then egg laying hens consuming this portion of the feed compositions will not obtain the benefit of the Vitamin $D_3$ metabolites, and further will not lay eggs with sufficient egg shell strength so as to avoid the egg breakage discussed above. However, since the above mentioned Vitamin $D_3$ metabolites are toxic at too high concentrations, those egg-laying hens which feed on portions of poultry feed containing too high a level of the Vitamin $D_3$ metabolites can become sick or even die.

Additionally, the two above mentioned Vitamin $D_3$ metabolites are extremely expensive. Accordingly, any attempts to directly mix said Vitamin $D_3$ metabolites into poultry feeds which result in loss of said Vitamin $D_3$ metabolites will prove uneconomical.

Prior attempts in the art of incorporating microgram amounts of the above mentioned Vitamin D metabolites into poultry feeds have mainly been conducted on a research level and have consequently circumvented many of the practical considerations necessary to achieve commercial success. These studies typically would incorporate the Vitamin $D_3$ metabolite by directly adding a freshly prepared oil solution of the metabolite to the animal feeds on a daily basis. This approach allows the investigator individual control of dose administrated but does not provide long term stability protection to the metabolite which is necessary in a practical commercial situation and is part of the present invention.

Prior attempts in the art of incorporating microgram amounts of the above-mentioned Vitamin D into poultry feeds also involved encapsulation of oil soluble microgram amounts of said Vitamin $D_3$ in an oil/water emulsion. Said oil/water emulsion is then dried by a variety of techniques to produce a particulate composition which is stable when mixed into feed premixes and feeds. The prior art also provides that said particulate compositions can contain antioxidants in the oil phase which contribute to the stability of the Vitamin $D_3$ and ingredients in the water phase of the emulsion, usually gelatin, gum acacia, modified food starches or casein plus plasticizers like sugars, which serve to retard oxygen diffusion into the oil phase of the emulsion and which also contribute to the structural integrity of the resulting particulate compositions.

As pointed out above, extremely low levels of Vitamin $D_3$ metabolites are required for improving the egg shell strength of older egg laying hens. Accordingly, if the above described technology for incorporating Vitamin $D_3$ into poultry feeds was used solely for the incorporation of Vitamin $D_3$ metabolites the approach would be economically inefficient.

Specifically, the effective levels of Vitamin $D_3$ metabolites for improving the egg shell strength and bone strength of older egg laying hens is from 1 to 5 micrograms per kilogram of poultry feed. These levels are 10-400 times less on a weight basis than other essential micronutrients like Vitamins $D_3$ and A which are required for proper nutrition in layers. Therefore, to ensure the proper distribution of Vitamin $D_3$ metabolites in poultry feeds (both to assure efficacy and to avoid the above discussed possible toxicity), Vitamin D metabolites must be incorporated at levels below 0.10% by weight in the stabilized dehydrated oil/water emulsion described. For example, to obtain 2 micrograms of metabolite per kilogram of poultry feed, a stabilized particulate composition containing 0.10% metabolite would be added to poultry feed at only 2.0 milligrams per kilogram. This level of addition is too low to ensure satisfactory distribution of these Vitamin D metabolites in poultry feeds. At such a low level of addition, distribution of Vitamin $D_3$ metabolites in poultry feed would be uneven. Those portions of the resulting poultry feed which contain too low a concentration of Vitamin D metabolites would not be adequate for older laying hens to lay eggs of sufficient strength to avoid economic loss through egg breakage or maintain proper bone strength as described above. Conversely, too high a concentration of Vitamin $D_3$ metabolites in the resulting poultry feed, will result in feed that is toxic and could cause illness or death to egg laying hens.

A preferred concentration of Vitamin $D_3$ metabolite in a stabilized particulate composition to be used for mixing into poultry feed so as to ensure a proper distribution of Vitamin $D_3$ metabolite in the final feed mix is about 0.010% by weight. A stabilized preparation at such a low concentration of Vitamin $D_3$ metabolite is economically wasteful since the cost of carrier materials, processing and quality control is high. It is known that layer feeds will have to contain other essential nutrients like Vitamin D and Vitamin A which are also fat soluble substances. If however, one incorporates the metabolite with other important micronutrient ingredients in the same particle then one can take advantage of the known efficacy of these ingredients and insure the proper distribution of Vitamin $D_3$ metabolite.

Therefore, a definite need exists for a Vitamin D metabolite containing poultry feed mixture which contains said Vitamin D metabolites at a uniform effective concentration for use in causing older laying hens to produce eggs of greater shell strength. Moreover, the need exists for a poultry feed mixture which does not contain said Vitamin D metabolites in too low a concentration, in which case said laying hens will not produce eggs of sufficient shell strength or bone strength so as to avoid egg breakage or in too high a concentration in which case the Vitamin D metabolites could prove toxic to the egg laying hens. Additionally, there exists a need for a poultry feed composition which incorporates Vitamin D metabolites in such a form as to protect said metabolites from moisture, oxygen, heat, light, and trace minerals. There exists a need for a poultry feed composition which incorporates Vitamin D metabolites placed in the same particle at the time of manufacture in such amounts so as to be economical as compared to the costs of the carrier materials and essential micronutrients like Vitamin D and Vitamin A for said feed compositions. Finally, such a combination product in which the Vitamin $D_3$ and Vitamin $D_3$ metabolite are in the same particle at the time of manufacture facilitates the analytical ability to monitor the incorporation of said metabolite onto the feed mixture by analysis for the other essential micronutrients which are known to be present in the invention. This is a significant advantage since the metabolite levels are so low in the feed as to be very difficult to monitor even on a research-much less routine-level.

SUMMARY OF THE INVENTION

The invention, therefore, is directed to an animal feed composition containing Vitamin $D_3$ metabolites in combination with other essential micronutrients like Vitamins $D_3$ and A, in such a form as to promote egg shell strength in older egg laying hens, and thereby prevent economic loss due to egg breakage. More specifically, the invention relates to a poultry feed mixture which contains Vitamin $D_3$ metabolites in combination with Vitamin $D_3$ in uniform ratio and effective concentration so as to promote eggshell strength and bone strength in older egg laying hens. Through use of the invention, Vitamin $D_3$ metabolites may be incorporated in poultry feed mixes in an economical and reliable manner as compared to the costs of the carrier materials, quality control costs associated with individual products of the essential micronutrient, and most importantly control the ratio and total concentration of Vitamin $D_3$ and $D_3$ metabolites to provide efficacy and avoid toxicity to the poultry.

Specifically, the invention relates to a composition of matter in which Vitamin D metabolites, preferably 1,25-dihydroxycholecalciferol or 1α-hydroxycholecalciferol and Vitamin $D_3$ are both present in each particle formed in a weight ratio ranging from about 1 to 2.5 to about 1 to 125. Alternatively, for example, Vitamin A acetate and Vitamin $D_3$ metabolite are present in a weight ratio of about 2000:1 to about 333:1. Further, the invention relates to poultry feed premixes which contain the just-above described particles. Also, the invention relates to finished poultry feeds (e.g. layer diets) themselves which contain the just-above mentioned particles.

Finally, the invention relates to a method for strengthening the shells of older egg laying hens and increases bone strength of all poultry which comprises feeding them finished poultry feeds which contain the just-above mentioned particles.

In addition to providing all of the above discussed advantages such as ensuring a uniform and proper concentration of Vitamin $D_3$ metabolites throughout the resulting poultry feed, the invention provides the additional benefit of optimizing the production of older egg laying hens. Specifically, the Vitamin $D_3$ metabolites contained in the feed compositions of the invention promote shell strength to the eggs laid by the older laying hens, while the Vitamin $D_3$ itself, for example, when it is contained in the particles, provides to the older egg laying hens the usual advantages of Vitamin $D_3$ in a diet such as optimum fertility, normal total egg production and absence of "pliable beak" syndrome.

The fat soluble Vitamins are preferred because they are similar in solubility profile, and can be incorporated into the same lipid phase of the emulsion product during manufacture. This more easily assayable component can preferably be selected from the essential nutrients which, like fat soluble vitamins, must be present in finished poultry feeds.

The invention also provides a product form which permits ready verification of the incorporation of the metabolites into a finished feed by having another known and more easily assayable component incorporated into the product form at the time of manufacture. This marker however, could also be any suitable tracer compound.

DETAILED DESCRIPTION OF THE INVENTION

As used herein the term "particle" means a small, discrete quantity of matter which can ran9e in size from about 50 to about 700 microns. A particle may be formed by any means which is conventional in the art. Exemplary of such particles are a beadlet, which can be cross-linked; a spray dried particle, an agglomerated particle or a flaked particle. A "tracer" component or marker s a water-soluble material or fat-soluble Vitamin which is present in a particle of the invention along with a Vitamin $D_3$ metabolite. Exemplary of tracer components or markers are F D & C colors, Vitamin A palmitate, Vitamin A propionate, Vitamin A acetate, riboflavin, or more preferably Vitamin $D_3$. A "poultry grain" is a grain which is conventionally used in poultry feed premixes as a premix diluent. Exemplary of poultry premix diluents are rice hulls, wheat middlings or soy flour. "Poultry feed" is poultry feed commonly used to raise poultry. Exemplary of a poultry feed is that described in the following literature reference: Poultry Nutrition 5th Edition, written by W. Ray Ewing The Ray Ewing Co. Pasadena Calif. 1963 pg 1416. The terms "poultry feed" and "conventional poultry feed" are used interchangeably herein. The term "finished poultry feed" means a poultry feed to which particles of the invention have been added. The term "detectable amount" of a tracer component or marker means an amount detectable by conventional, commercial analytical means. This will vary depending upon tracer. For example, the amount for Vitamin $D_3$ is about 12.5 to about 1250 μg/kg feed; and the amount for Vitamin A is about 700 to about 2500 μg/kg feed.

Specifically, it has been discovered that particles containing Vitamin $D_3$ metabolites such as 1α,25-dihydroxycholecalciferol or 1α-hydroxycholecalciferol and Vitamin $D_3$ itself in a weight ratio in each particle ranging from about 1 to 2.5 to about 1 to 125, provides for a composition which can be mixed into poultry feeds advantageously. Specifically, said particles enable Vitamin $D_3$ metabolites to be added to poultry premixes in a uniform concentration. A poultry premix comprising said particles, that is, a poultry premix of the invention, may then be added to a conventional poultry feed to achieve a poultry finished feed having a uniform effective concentration of Vitamin $D_3$ metabolites for promoting egg shell strength and bone strength in older egg laying hens.

Alternatively, where Vitamin A acetate is used as the marker it is used in a weight ratio to Vitamin $D_3$ metabolite of about 2000:1 to about 333:1.

In such spray dried, flaked, agglomerated, spray chilled, or other similar particle size products such as beadlets, the Vitamin $D_3$ metabolites are neither provided in such a low concentration as to be ineffective in promoting egg shell and bone strength, nor are they provided in such a high concentration so as to prove toxic to the egg laying hens. Additionally, in such form, Vitamin $D_3$ metabolites can be added to finished poultry feed in amounts which are economical as compared against the costs of the other carrier materials and quality control costs associated with the use of individual product forms of essential micronutrients. Also, in such form, the Vitamin $D_3$ metabolites can be added in such a manner that they avoid instability to oxygen, light, heat and trace minerals.

As pointed out above, the difficult problem of achieving a uniform concentration of Vitamin $D_3$ metabolites in a premix is solved through addition of particles of the invention. The thus formed premix of the invention is then added to conventional poultry feeds to solve the even more difficult problem of achieving a poultry finished feed having a uniform effective concentration of Vitamin $D_3$ metabolites.

Additionally, the particles of the invention provide a marker for the Vitamin $D_3$ metabolites added. That is, at the usual low concentrations in which Vitamin $D_3$ metabolites are effective for the purpose of improving egg shell and bone strength in older egg laying hens, said Vitamin $D_3$ metabolites cannot be quantitated by the usual chemical analysis methods available to those who test feed mixtures. However, the Vitamin D itself is present at a sufficiently high concentration so as to be detectable by the usual analytical methods available to those who analyze poultry feed mixtures. Therefore, someone who knew that the present poultry feed mixtures contain particles which consisted mostly of Vitamin $D_3$, per se and some smaller amount of Vitamin $D_3$ metabolites could analyze the feed mixture for Vitamin D3, per se. The presence of the proper Vitamin $D_3$ level, would demonstrate that the Vitamin $D_3$ metabolites were present in the lower, effective desired level.

Also, the invention provides for a poultry feed premix which optimizes the performance of older egg laying hens. Specifically, by containing particles which comprise both Vitamin $D_3$ itself and Vitamin $D_3$ metabolites, the present poultry feed mixture provides a composition which affords the usual additional or other benefits of Vitamin $D_3$ in a diet, such as bone strength, with the benefits of Vitamin $D_3$ metabolites which improve the egg shell strength of older egg laying hens. A poultry feed premix of the invention can be prepared by mixing, through conventional methods, particles of the invention with a carrier material. Exemplary of carrier materials are rice hulls, wheat middlings or soy meal. A poultry feed premix of the invention may also contain other Vitamins commonly added to poultry feed such as Vitamin A, Riboflavin or Vitamin E. In a poultry feed premix, particles and poultry premix diluent (carrier) can be present in a weight ratio of about 1:1000 to about 5:1000.

Finally, a finished poultry feed comprising a poultry feed premix described above and conventional poultry feed can be prepared by usual means. The resulting finished poultry feed can then be fed to poultry to confer the advantages described herein. In the resulting finished poultry feed, poultry feed premix and conventional poultry feed can be present in a weight ratio of about 1:2000 to about 1:200.

Process(es) for Forming Particles of the Invention are described below:

A. Encapsulation & Spray Drying

A Vitamin D and Vitamin $D_3$ metabolite containing spray dried powder in accordance with the invention can be prepared so that the Vitamin $D_3$ is present in 2,000,000 IU (50 mg/gm) per gram and the Vitamin $D_3$ metabolite, 1α,25dihydroxycholecalciferol is present in 16,000 IU (400 ug/gm) per gram.

The number of IU per micrograms (ug) of Vitamin $D_3$, 1-hydroxycholecalciferol (1(OH)CC), and 1,25-dihyroxycholecalciferol (DHCC) is given in table I just below:

TABLE I

| Conversion factors of Vitamin D3 and Vitamin $D_3$ Metabolites | |
|---|---|
| | IU/ug |
| Vitamin $D_3$ | 40 |
| 1,25 DHCC | 40 |
| 1(OH)CC | 40 |

An encapsulating agent is blended with a plasticizer and an antimicrobial preservative. The resulting blend is dispersed in distilled water with agitation. The dispersion is performed at about 50° to 60° C. When the dispersion is complete there is a single aqueous phase.

An edible oil such as peanut oil is heated to about 40° to 50° C. An antioxidant such as BHT is added and Vitamin D pastilles are added with agitation.

Into a separate batch of peanut oil is dissolved Vitamin D metabolite at about 35° to 45° C. The peanut oil and Vitamin D metabolite are mixed until all solids are in solution and said solution is added to the just above described mixture of peanut oil and Vitamin D. The two batches of peanut oil when mixed together represent the complete lipid phase. Using a Gifford/Wood homogenizer the lipid phase is emulsified with the aqueous phase with water being added as necessary. The resultant emulsion is intermittently checked under a microscope at a400X. The emulsifying step is complete when the individual lipid particles are about 1 to about 3 microns in diameter.

This resulting emulsion is spray dried using a suitable laboratory spray dryer.

A more specific example of a spray dried powder containing Vitamin D and Vitamin D metabolite is set forth just below in example 1.

EXAMPLE 1

| Vitamin $D_3$ & Vitamin $D_3$ Metabolite Spray Dried Powder | |
|---|---|
| Label: | |
| Vitamin $D_3$: | 2,000,000 IU/gram (50 mg/gm) |
| Vitamin $D_3$ Metabolite: | 16,000 IU/gram 1,25 DHCC (400 ug/gm) |
| Formulation Ingredient | Grams/500.0 Grams |
| Modified Food Starch | 350.00 (W/ca 10% Moisture) |
| Lactose | 26.00 |
| Sodium Benzoate | 2.50 |
| Sorbic Acid | 1.00 |
| Peanut Oil | 60.00 |
| BHT | 31.00 |
| Vitamin $D_3$ Pastilles ($20 \times 10^6$ IU/gm) | 55.00 |
| Vitamin $D_3$ Metabolite (1,25 DHCC) | 0.200 |
| Distilled Water: | Q.S. for ca 50% total solids |

Procedure:
1) Blend modified food starch, Lactose, Na Benzoate and Sorbic Acid.
2) Disperse blend in about 300 ml of 55° C. Distilled Water with agitation; hold 55° C—This complete the aqueous phase.
3) Heat 50 grams of peanut oil to 45° C.; add BHT and Vitamin $D_3$ Pastilles with agitation.
4) In 10 grams of peanut oil, dissolve Vitamin $D_3$ Metabolite 40° C., mix until all solids are in solution; add solution to solution from step 3. This completes the lipid phase.
5) With the Gifford/Wood homogenizer-emulsify lipid phase into the aqueous phase. Add 200 ml Distilled Water as necessary. Check emulsion under microscope of 400X magnification. Particle size should be 1-3 Microns.
6) Spray Dry—Anhydro Laboratory Spray Dryer B. Encapsulation and Beadleting It is understood that of the two Vitamin D metabolites which may be included with Vitamin D in the beadlets of the invention, 1α,25-dihydroxycholecalciferol is preferred.

Beadlets of the invention which contain about 100,000 IU per gram of Vitamin $D_3$ and 2,000 IU per gram of Vitamin $D_3$ metabolite may be prepared by casting methods as follows.

An encapsulating agent and a plasticizer are blended with water to form about a 50% aqueous solution. An edible oil, such as peanut oil is heated to about 45° to 55° C. and antioxidant such as BHT and Vitamin D pastilles are dissolved therein. The resulting peanut oil mixture is held at about 40° to 50° C. An additional batch of peanut oil is heated to about 40° to 50° C. with agitation. With continuing agitation Vitamin $D_3$ metabolite is blended into this additional batch of peanut oil. The second batch of peanut oil containing the mixed Vitamin $D_3$ metabolite is blended into the first batch of peanut oil to prepare the complete lipid phase.

This lipid phase is homogenized with the 50% aqueous solution of encapsulating agent and plasticizer until the particle size of each lipid particle is about 1 to about 3 microns as per examination under a microscope at 400X. Distilled water is added to this homogenized lipid phase. Beadlets are cast in a chilled, (about −20° to 0° C.) dry flow bed which employs a ratio of about 7 to 1 dry flow to emulsion solids. The resulting beadlets are held in dry flow overnight and tray dried.

A more specific example of cast beadlets of the invention is set forth in example 2 just below.

EXAMPLE 2

| Vitamin $D_3$ & Vitamin $D_3$ Metabolite Beadlets (100,000/2000) | |
|---|---|
| Label: | |
| Vitamin $D_3$ | 100,000 IU/gram (2.5 mg/gm) |
| Vitamin $D_3$ Metabolite | 2,000 IU/gram (50 ug/gm) |
| Formulation Ingredient | Grams |
| Gelatin | 293.00 |
| Sucrose | 100.00 |
| Peanut Oil | 60.00 |
| BHT | 1.60 |
| Vitamin $D_3$ Pastilles ($20 \times 10^6$ IU/gm) | 2.75 |
| Vitamin $D_3$ Metabolite (1α,25 DHCC) | 0.030 |
| | 457.65 Grams |

Procedure
1) Blend Gelatin and Sucrose; prepare a 50% aqueous solution.
2) Heat 50 grams of peanut oil to about 50° C. dissolve BHT and Vitamin $D_3$ Pastilles. Hold at 45° C.
3) Heat remaining 10 grams of peanut oil to 45° C. with agitation dissolve the Vitamin $D_3$ Metabolite. Blend (2) into (3).
4) Homogenize lipid phase into aqueous phase. Emulsifying until particle size is 1–3 Microns which is checked at a magnification of 400X.
5) Add distilled water; Q.S. for 45 weight per cent solids.
6) Cast beadlets in chilled (−10° C.) Dry Flo bed with ratio of about 7:1 (Dry Flo to emulsion solids).
7) Hold beadlets in dry flo overnight and tray dry.

EXAMPLE 3

A further method for preparing beadlets that exhibit the additional property of being insoluble in boiling water is described in U.S. Pat. No. 4,670,247 which is incorporated herein by reference. This procedure has the added potential of enhancing the chemical stability of the encapsulated active ingredient (tracer and Vitamin $D_3$ metabolite) especially in finished feeds that have been prepared by heat and steam processes like extrusion. This procedure is also appropriate for preparing the combination product of the herebefore described invention.

| Vitamin D₃ and Vitamin D₃ Metabolite Beadlets (100,000/4,000) weight ratio | |
| --- | --- |
| label | |
| Vitamin D₃ | 100,000 IU/gm |
| | (2.5 mg/gm) |
| Vitamin D₃ Metabolite | 4,000 IU/gm |
| | (100 ug/gm) |
| Formulation | grams |
| Gelatin | 298 |
| High Fructose Corn Syrup (77% solids) | 50* |
| Glycerine | 45 |
| peanut oil | 60 |
| BHT | 1.60 |
| Vitamin D₃ pastilles (20 × 10⁶ IU/gm) | 2.75 |
| Vitamin D₃ Metabolite (1,25 DHCC) | 0.06 |
| | 475.41 |

*dry basis

Procedure—

1. Heat approximately 300 grams of distilled water to 65° C. Add gelatin and dissolve. When the solution is complete add the high fructose corn syrup and glycerine.
2. Heat 50 grams of peanut oil to about 50° C. Dissolve BHT and Vitamin D₃ Pastilles. Hold at 45° C.
3. Heat the remaining 10 grams of peanut oil to about 45° C. Dissolve the Vitamin D₃ metabolite. Blend 2 into 3.
4. Homogenize the lipid phase into the aqueous phase. Emulsify until the particle size of the dispersed lipid phase is 1-3 microns when examined under light microscope which is checked at a magnification of about 400X.
5. Add additional distilled water sufficient to adjust total solution solids to 45 weight %.
6. Cast beadlets into a chilled (−20° to 0° C.) dry flow starch bed with ratio of about 7:1 (Dry flow Starch to Emulsion solids).
7. Hold beadlets on dry flow starch overnight. Separate the partially dried beadlets from the starch by screening through a 170 mesh screen. Tray dry the beadlets to approximately 4-5% moisture.
8. Crosslink the dried beadlets by heating to 150° C. for approximately 15 minutes in an electric oven. The resulting product is insoluble in boiling water.

We claim:

1. A particle for use in poultry feed comprising a Vitamin D₃ tracer and a Vitamin D₃ metabolite selected from the group consisting of 1α, 25-dihydroxycholecalciferol and 1α-hydroxycholecalciferol, wherein the weight ratio of the Vitamin D₃ metabolite to the Vitamin D₃ tracer is about 1:2.5 about 1:125.

2. A particle in accordance with claim 1, wherein the vitamin D₃ metabolite is 1α,25-dihydroxycholecalciferol.

3. A particle in accordance with claim 1, in the form of a beadlet, a spray dried particle, an agglomerated particle, or a flaked particle.

4. A particle in accordance with claim 3 in the form of a beadlet.

5. A particle in accordance with claim 4, further comprising an encapsulating agent, a plasticizer, an edible oil, a tracer component, and an antioxidant.

6. A particle in accordance with claim 1, wherein the vitamin D₃ metabolite is present in about 0.010 weight %.

7. A particle in accordance with claim 1 which further comprises an anti-oxidant.

8. A particle in accordance with claim 1, having a size from about 50 to about 700 microns.

9. A particle for use in poultry feed comprising a Vitamin D₃ metabolite selected from the group consisting of 1α, 25-dihydroxycholecalciferol and 1α-hydroxycholecalciferol, and a tracer component selected from the group consisting of Vitamin A palmitate, Vitamin A propionate and Vitamin A acetate, wherein the weight ratio of the Vitamin A tracer to the Vitamin D₃ metabolite is about 2000:1 to about 333:1.

10. A particle in accordance with claim 9, wherein the tracer is vitamin A acetate.

11. A particle in accordance with claim 9, wherein the Vitamin D₃ metabolite is 1α, 25-dihydroxycholecalciferol.

12. A particle in accordance with claim 9, in the form of a beadlet, a spray dried particle, an agglomerated particle, or a flaked particle.

13. A particle in accordance with claim 12, in the form of a beadlet.

14. A particle in accordance with claim 9, wherein the Vitamin D₃ metabolite is present in about 0.010 weight %.

15. A particle in accordance with claim 14, further comprising an encapsulating agent, a plasticizer, an edible oil, a tracer component and an antioxidant.

16. A particle in accordance with claim 9, which further comprises an anti-oxidant.

17. A particle in accordance with claim 9, having a size from about 50 to about 700 microns.

18. A finished poultry feed comprising a conventional poultry feed and particles of a Vitamin D₃ metabolites selected from the group consisting of 1α,25-dihydroxycholecalciferol and 1α-hydroxycholecalciferol, and Vitamin D₃ in a ratio of from about 1:2.5 about 1:125 Vitamin D₃ metabolite to Vitamin D₃, and wherein the amount of Vitamin D₃ tracer is from about 12.5 to about 1250 μg/kg finished feed.

19. A finished poultry feed in accordance with claim 18, wherein the vitamin D₃ metabolite is 1α,25-dihydroxycholecalciferol.

20. A poultry feed premix comprising a premix diluent and particles of a Vitamin D₃ metabolite selected from the group consisting of 1α, 25-dihydroxycholecalciferol and 1α-hydroxycholecalciferol, and a Vitamin D₃ tracer in a ratio of from about 1:2.5 to about 1:125 Vitamin D₃ metabolite to Vitamin D₃, and, wherein the weight ratio of the particles to the premix diluents is about 1:1000 to about 5:1000.

21. A finished poultry feed comprising a conventional poultry feed and particles of a Vitamin D₃ metabolite selected from the group consisting of 1α, 25-dihydroxycholecalciferol and 1α-hydroxycholecalciferol, and a tracer component selected from the group consisting of Vitamin A palmitate, Vitamin A propionate and Vitamin A acetate in the ratio of about 2000:1 to about 333:1 of Vitamin A tracer to Vitamin D₃ metabolite; and wherein the amount of Vitamin A tracer is from about 700 to about 2500 μg/kg finished feed.

22. A finished poultry feed in accordance with claim 21, wherein the Vitamin D₃ metabolite is 1α, 25-dihydroxycholecalciferol.

23. A poultry feed premix comprising a poultry premix diluent and particles of a Vitamin D₃ metabolite selected from the group consisting of 1α, 25-dihydroxycholecalciferol and 1α-hydroxycholecalciferol and a tracer component selected from the group consisting of Vitamin A palmitate, Vitamin A propionate and Vitamin A acetate in the ratio of about 2000:1 to about 333:1 of Vitamin A tracer to Vitamin D₃ metabolite and wherein the weight ratio of particles to poultry premix diluent is about 1:100 to about 5:1000.

* * * * *

UNITED STATES PATENT AND TRADEMARK OFFICE
CERTIFICATE OF CORRECTION

PATENT NO. : 5,043,170
DATED : August 27, 1991
INVENTOR(S) : Benjamin Borenstein, William Joseph Mergens and Govind Gajanan Untawale It is certified that error appears in the above-identified patent and that said Letters Patent is hereby corrected as shown below:

Claim 1, Column 9, line 50: "1:2.5 about" should be
--- 1:2.5 to about --- .

Claim 18, Column 10, line 29: "metabolites" should be
--- metabolite --- .

Claim 18, Column 19, line 32: "1:2.5 about" should be
--- 1:2.5 to about --- .

Signed and Sealed this

Thirtieth Day of March, 1993

*Attest:*

STEPHEN G. KUNIN

*Attesting Officer*   Acting Commissioner of Patents and Trademarks